United States Patent [19]

Aldrich

[11] 4,226,118
[45] Oct. 7, 1980

[54] LEVEL DETECTOR

[75] Inventor: Joe L. Aldrich, Kingwood, Tex.

[73] Assignee: Keystone International, Inc., Houston, Tex.

[21] Appl. No.: 928,820

[22] Filed: Jul. 28, 1978

[51] Int. Cl.³ ............................................. G01F 23/28
[52] U.S. Cl. .................................... 73/290 V; 331/65
[58] Field of Search ............... 73/290 V, 617, 304 C, 73/290 R; 340/621, 620; 331/65

[56] References Cited

U.S. PATENT DOCUMENTS

| | | | |
|---|---|---|---|
| 3,807,231 | 4/1974 | Spaw | 73/290 R |
| 3,935,970 | 2/1976 | Spaw | 222/56 |

*Primary Examiner*—Donald O. Woodiel
*Attorney, Agent, or Firm*—Browning, Bushman & Zamecki

[57] ABSTRACT

Disclosed are apparatus and methods for detecting the extent to which material is present at a predetermined sensing area. An antenna probe is extended throughout the sensing area, and is loaded with a signal from an oscillator. A reference oscillator provides a constant-frequency signal of the same base frequency as the antenna oscillator signal. The presence of impedance-affecting material in the sensing area reduces the impedance load of the antenna and, therefore, the frequency of the output signal of the antenna oscillator in proportion to the extent of immersion of the antenna probe in such material. The output signals from both oscillators are compared in a frequency differencer circuit which produces output signals whose frequency, equal to the difference in frequencies of the two oscillator output signals, is an indication of the amount of material present in the sensing area. A testing circuit provides an indication of the frequency of the differencer output signal, and is used in adjusting the sensitivity of the detector circuitry with the antenna probe free of impedance-affecting material. With the oscillator sensitivities adjusted, the detector circuitry is zeroed, again with reliance on the testing circuit to indicate when both oscillators are generating the same output frequency. The differencer output signals may be converted to voltage levels proportional to the extent material is present at the antenna probe. Such voltage levels may be used, ultimately, to operate one or more devices to indicate the amount of material present in the sensing area and/or to control the amount of material in the sensing area.

42 Claims, 3 Drawing Figures

LEVEL DETECTOR

BACKGROUND OF THE INVENTION

1. Field of the Invention

The present invention pertains to apparatus and methods for detecting the extent of the presence of material at a predetermined sensing area. More particularly, the present invention relates to systems for determining the amount of material accumulated at a locale. Apparatus and methods of the present invention find particular application in cases of material storage in containers, such as bins, wherein the amount of material present may be determined by detecting the depth of material in the bin. Appropriate indicators, or warning devices, may be operated ultimately by use of the present invention, and systems for adding material, or removing material, may also be operated in response to the sensing of the amount of material present by use of the instant invention.

2. Description of the Prior Art

Several prior art systems for measuring material levels in bins include the use of mechanical probes which extend into the bin. Such a probe is made to vibrate, and the physical characteristics of the elastic disturbances, which are affected by the quantity of material present about the probe, are analyzed in terms of the quantity of material present.

Other prior art devices rely upon the variation of one or more electrical properties affected due to the presence of material at different levels within the bin. Thus, capacitive reactance of one or more probes may be affected to signal the amount of material present. The operation of an oscillator circuit, including a resonant probe, may be affected to operate a control system in response to the presence of material near the resonant probe.

U.S. Pat. Nos. 3,807,231 and 3,935,970 disclose a measuring system and apparatus wherein the reactance of an antenna probe varies as a function of the level of material in the container adjacent the antenna. The antenna reactance controls the frequency of a transmitter signal, which is then combined with a constant frequency reference signal. The frequency of the resulting difference signal is used to operate a material level indicator and to provide control information for operating automatic systems for controlling the material level.

An amplitude-modulated detector circuit is disclosed in United States patent application Ser. No. 844,040 filed Oct. 20, 1977 and assigned to the Assignee of the present invention. There, a crystal-controlled oscillator generates a constant-amplitude signal which is fed through a load resistor to an antenna probe circuit. Variations in the amplitude of this loaded signal, due to the presence of material to be detected about the antenna probe, are reflected in variations in the value of a d-c voltage level. The variable voltage level is combined with a reference voltage level and the resulting signal is fed to a switching circuit, The switching circuit provides an output signal depending on a comparison between the combined signal and a second reference level.

A detector circuit is disclosed in United States patent application Ser. No. 877,028, filed Feb. 10, 1978 and assigned to the Assignee of the present invention. There, an antenna probe forms an arm of an impedance bridge on which is impressed a constant-frequency, constant-amplitude signal generated by an oscillator. Presence of material at the antenna probe affects the impedance of the bridge and accordingly alters the amplitude of the signal which is then converted to a d-c voltage level. A switching circuit includes a comparator which compares the d-c voltage level with a reference level, and produces an output signal indicative of the presence or absence of material at the antenna probe. The sensitivity of the switching circuit may be adjusted to accomodate variations in the effect different materials to be detected may have on the impedance of the antenna probe. The switching circuit itself is equipped with a light emmitting diode, and functions as a calibration circuit for the detector circuitry.

The advantage of matching the sensitivities of such detector circuits to the material to be detected is recognized in the art. The effect on the impedance of detector antenna probes is directly dependent on the electromagnetic character of the material being detected. Regardless of the magnitude of the antenna load impedance variation effected by the presence of material in the storage area, the detector circuit output signal must exhibit a gross change to reflect the level of material in the storage area. Consequently, where the material being stored exhibits but a slight effect on the antenna load impedance, the sensitivity of the detector circuit must be sufficiently acute to respond. However, in the case of storage materials producing greater effects on the antenna load impedance, the sensitivity of the detector may be reduced. In any case, if the sensitivity of the detector circuit is too low in relation to the material being detected, the detector circuit may not respond to the presence of such material surrounding the antenna probe. On the other hand if the sensitivity of the detector circuit is too high, false readings of the presence of material at the antenna probe may result due to stray electrical noise, the flow of material past the antenna probe as the storage area is being filled, or possibly even mechanical vibrations.

The aforementioned Ser. No. 877,028 application includes a provision for readily adjusting the sensitivity of an amplitude-modulated discrete point level detector. Currently, it is known to construct a frequency-modulated continuous level detector with the sensitivity of the circuitry matching anticipated material to be detected by appropriately constructing hand-wound coils for use in the oscillator circuits. However, such a technique does not readily permit alteration of the circuitry sensitivity where the detector is to be used with a variety of storage materials.

SUMMARY OF THE INVENTION

The present invention provides a frequency-modulated continuous level detector including a switch-adjusted sensitivity control capability and an on-board test circuit for both adjusting the sensitivity of, and zeroing, the detector circuitry.

An antenna probe extends into the sensing area for loading with a signal generated by an antenna oscillator at a predetermined base frequency. A reference oscillator produces a like signal at the same base frequency. The outputs of both oscillators are compared in a differencer circuit which produces output signals whose frequency is equal to the difference between the frequencies of the two oscillator circuit outputs. The impedance of the antenna probe is decreased in proportion to the extent of the antenna immersed in material in the sensing area. The frequency of the output signal from the antenna oscillator is reduced accordingly. Thus, the frequency of the output signals generated by the differencer circuit increases as more of the antenna probe is immersed in material in the sensing area.

Each of the two oscillators features a feedback loop including a collection of capacitors. The capacitors in each case may be selectively connected across the feedback loop by use of a switch. The sensitivity of each oscillator may be varied by so adjusting the capacitance in the respective feedback loop, the sensitivity decreasing as the feedback loop capacitance increases.

A counter circuit functions as an on-board test circuit. One of the differencer circuit output signals is fed to a binary counter which counts the voltage variations in the differencer output signal and produces a sequence of output signals each of whose frequency is a fractional multiple of the differencer signal frequency. Further, the binary counter output signals are initiated in sequence of decreasing frequency, and the counting period is limited by the occurence of a periodic reset signal from a timing circuit. Each counter output signal operates a light emitting diode to indicate the existence of that signal. For a given reset signal period, the number of counter output signals produced is an indication of the magnitude of the frequency of the differencer output signal.

The sensitivity of the antenna oscillator is adjusted to match the nature of the effect on the antenna impedance produced by the material anticipated to be detected in the sensing area. This may be readily done by appropriately positioning the switch in the antenna oscillator to select the appropriate capacitance in the feedback loop. The detector is positioned with the antenna extending through the sensing area, and with no detectable material present. Under these conditions, several of the light emiting diodes of the counter circuit may be lit.

The sensitivity of the reference oscillator is then varied to match that of the antenna oscillator by appropriately positioning the reference oscillator switch to select the correct capacitance in the corresponding feedback loop. The reference oscillator sensitivity is matched to that of the antenna oscillator when the number of operating light emitting diodes in the counter circuit is minimized under the aforementioned conditions.

With the sensitivities of the two oscillators thus adjusted, the detector circuit is zeroed by varying the frequency of the reference oscillator output signal by means of a variable resistor. When all of the light emitting diodes have been extinguished to indicate that the reference oscillator output signal frequency is equal to the base frequency of the antenna oscillator, the detector circuit is zeroed and ready for use.

In a method of the present invention, an antenna probe is extended into a sensing area and loaded with an oscillatory signal. The sensitivity of the antenna oscillator is adjusted to match the electromagnetic properties of the anticipated material to be detected in the sensing area by appropriately adjusting the capacitance in the feedback loop of the antenna oscillator. A reference oscillator is provided, and the output signals from both oscillators are compared in a difference circuit to produce output signals whose frequency is equal to the difference in the frequencies of the two oscillator output signals.

The output from the differencer circuit is analyzed by a binary counter in an on-board test circuit to produce a sequence of oscillatory signals whose frequencies are dependent on the differencer circuit output signal frequency. Visual displays are provided whereby the generation of each output signal by the binary counter may be separately noted.

With no detectable material present in the sensing circuit, the sensitivity of the reference oscillator is adjusted to match that of the antenna oscillator by similarly varying the capacitance in the reference oscillator feedback loop. Minimization of output signals generated by the binary counter by so varying the reference oscillator feedback capacitance indicates the matching of the sensitivities of the two oscillators. The detector circuitry may then be zeroed by adjusting the frequency of the reference oscillator output signal to match that of the antenna oscillator signal, as indicated by total lack of output signal production by the binary counter. Thus, the frequency of the differencer circuit output signals becomes zero.

With the antenna probe positioned in the sensing area, and the detector circuitry zeroed and its sensitivity adjusted as described, the extent of material present in the sensing area may be detected. The greater the proportion of the antenna probe that is exposed to impedance-affecting material, the greater will be the drop in frequency of the antenna oscillator output signal and, accordingly, the greater will be the rise in frequency of the differencer circuit output signals. The differencer circuit output signals may be transmitted to a receiver which produces a d-c voltage level proportional in value to the frequency of the differencer output signals. The d-c signal may be utilized by a control unit to operate analog display devices indicating the extent of material present in the sensing area. The d-c voltage level may also be utilized to operate digital display devices reflecting the extent of material in the sensing area.

The control-unit may operate devices to affect the amount of material in the sensing area. For example, appropriate apparatus to add material to the sensing area and/or to remove material from the sensing area may be automatically operated by the control unit in response to appropriate values of the d-c voltage level generated by the receiver. Thus, for example, material may be automatically added to the sensing area when the detector circuit indicates the quantity of material already present is at a relatively low value. Further, the process of adding such material to the sensing area may be ceased when the detector circuit indicates that a second level in the sensing area has been reached. Also, material may be automatically removed from the sensing area in response to the detector circuit indicating a specific quantity of material present in the sensing area, and the removal operation ceased when the amount of material in the sensing area has been reduced to a certain value, again as determined by the detector circuit.

While it will be appreciated that the method and apparatus of the present invention may be employed in a variety of situations, and to detect the presence and amount of a variety of materials, the present invention finds particularly advantageous application to storage containers, such as bins. Thus, the antenna probe may be positioned generally vertically throughout the height of a bin, or a portion thereof. Output from the detector circuit may trigger a control unit to open and/or close the bin door to control the removal of material from the bin. Also, such a control unit may operate a feed mechanism to add more material to the bin. In such a case, the sensing area is generally within the bin and along the antenna probe. The provision for readily adjusting the detector sensitivity, as well as zeroing the detector circuitry, assisted by the presence of the on-board test circuit, allows the detector of the present invention to be employed for sensing a variety of materials. When the nature of material to be stored in a particular bin is changed, for example, the detector circuitry sensitivity may be readily changed by simply adjusting the oscillator switches as discussed hereinbefore, relying on the testing circuit as an indicator of the matching of oscillator sensitivities. Zeroing of the detector circuitry, again with reliance on the testing circuit, may then be readily achieved by a simple adjustment. The present invention thus provides a continuous level detector with adjustable sensitivity that is convenient to use and readily applicable for use in detecting a variety of materials.

DESCRIPTION OF PREFERRED EMBODIMENTS

Figure 1:
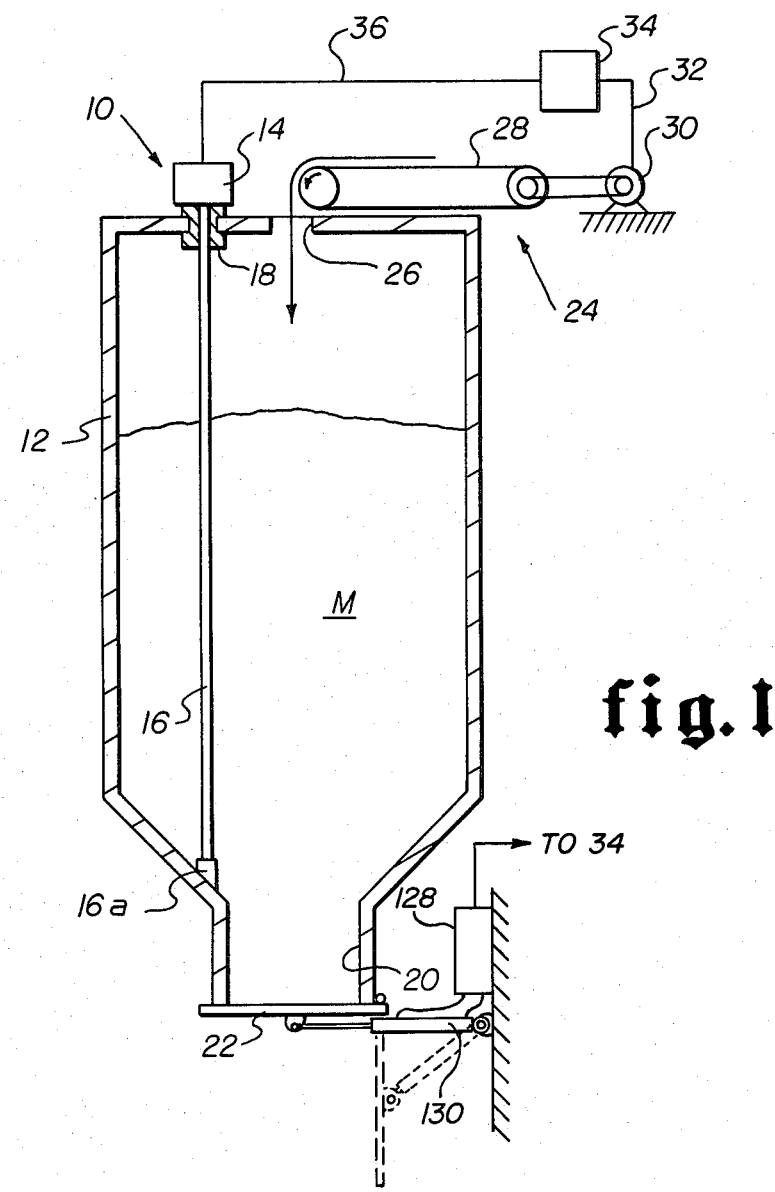
FIG. 1 is a vertical cross-sectional view illustrating a material container equipped with a detector according to the present invention connected to a material feed mechanism.

In FIG. 1, the detector of the present invention, shown generally at 10, is mounted at the top of a bin, or material container, 12 containing a quantity of material M. The detector 10 includes a unit 14 containing electrical circuitry, an antenna probe 16 extending downwardly within the bin 12, and a connector 18 by which the detector 10 is mounted on the bin while the antenna probe is insulated from the bin walls. The antenna 16 may be in the form of a rigid rod suspended from the unit 14, or may be a flexible cable or a wire anchored at some point within the bin 12 by an insulating fixture 16a as shown.

The bin 12 is of conventional construction, having a dispensing opening 20 at its lower end which is covered by a door 22. When the door is opened, as indicated by the dashed lines, material within the bin 12 flows by gravity from the opening 20.

A material feed system, shown generally at 24, is located at the top of the bin 12 to introduce material into the bin through an opening 26. The feed system 24 is shown schematically to include a conveyor belt 28 operated by a motor 30 which in turn is joined by an appropriate connector 32 to a combination receiver and control unit 34. The receiver/control unit 34 is connected by an appropriate connector 36 to the electrical circuitry within the detector 10. Thus, as is more fully discussed hereinafter, the detector 10 may operate the control unit 34 in response to sensing material at various levels within the bin, whereby the control unit may, for example, cause the feed system at 24 to cease adding material to the bin.

Figure 2:
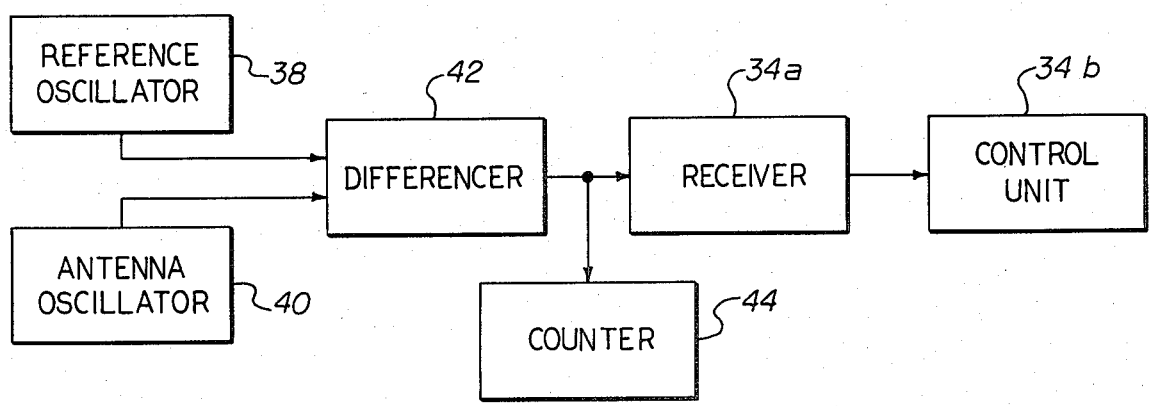
FIG. 2 is a block diagram indicating features of the present invention.

The electrical circuitry of the level detector of the present invention is indicated generally in FIG. 2. A variable frequency reference oscillator 38 provides a constant-frequency, constant-amplitude signal at a selected frequency. An antenna oscillator 40, which includes the antenna probe 16 of FIG. 1, is also a variable frequency oscillator.

The output frequency of the reference oscillator 38 is selected in conjunction with the selection of a base frequency for the antenna oscillator 40. Subsequent presence of material about the antenna probe 16 causes the frequency of the output signal from the antenna oscillator 40 to vary accordingly. With no material surrounding the antenna probe 16 in the bin 12, the output signals from both oscillators 38 and 40 are adjusted to be of the same frequency. Generally, as material is added to the bin and built up about the antenna probe 16, the impedance load of the antenna decreases, causing the output signal of the antenna oscillator 40 to decrease accordingly. The greater the proportion of the entire antenna probe that is surrounded by material, the lower is the impedance of the antenna and the lower is the frequency of the oscillator 40 output signal. Thus, the frequency of the antenna oscillator 40 output signal reflects the extent of filling of the material bin 12.

Output signals from both oscillators 38 and 40 are transmitted to a frequency differencer circuit 42. This latter circuit 42 compares the frequencies of the two input signals and produces an output signal whose frequency is the difference between the frequencies of the two input signals. Thus, for example, with both oscillators 38 and 40 generating output signals of the same frequency, the output of the differencer circuit 42 is a zero-frequency, or constant level, signal. As the two oscillator signals are moved further apart in frequency value, the frequency of the differencer circuit 42 output increases.

The output from the differencer circuit 42 is transmitted to a receiver 34a where the signals are converted to constant voltage level signals with the voltage levels proportional to the frequencies of the differencer output.

The receiver 34a may be a circuit of conventional design for receiving such transmitted signals and for converting them into output voltage level signals whose voltage values are proportional to the corresponding input signal frequencies.

The voltage level signals from the receiver 34a are transmitted to a control unit 34b. The control unit 34b may be of any conventional design adapted, for example, for operating the feed mechanism 24 of FIG. 1. Thus the control unit 34b may automatically operate the feed mechanism 24 to add material to the bin 12 in response to a voltage level signal from the receiver 34a indicating that the level of material M within the bin 12 has fallen below a certain position. Similarly, the control unit 34b may cease the operation of the feed mechanism 24 when the detector 10 generates a voltage level signal indicating that the material level in the bin has exceeded a certain point. The control unit 34b may also operate the opening and closing of the bin door 22 and/or send information to one or another indicators, display devices, or recording instruments to reveal the level of material within the bin 12.

The receiver 34a and control unit 34b may be combined in a single unit 34 as discussed hereinbefore in relation to FIG. 1, or may be separate units. Further, one or both of the elements 34a and 34b may be contained within the circuit unit 14 of the detector device 10.

A counter circuit 44, serving as a test circuit, also receives an output signal from the differencer circuit 42. The counter circuit 44 counts the number of signal voltage variations in the differencer signal in a given period of time, and provides a visual display reflecting the counted value. Thus, the counter circuit 44 serves as a frequency indicator device, and is used in adjusting the sensitivity of, and zeroing, the reference oscillator 38.

Figure 3:
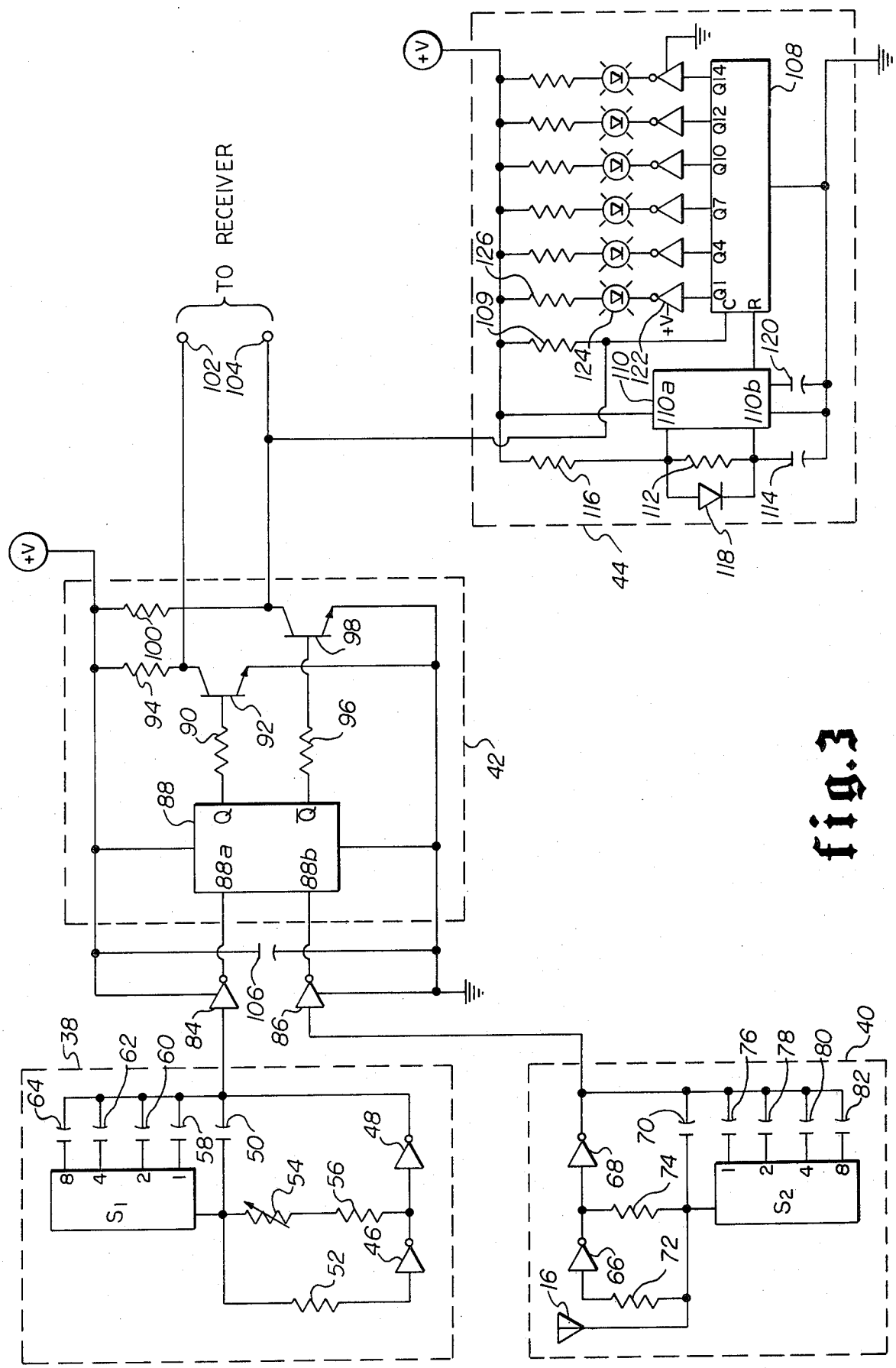
FIG. 3 is a schematic diagram of the electrical circuitry employed in a preferred form of the present invention.

The elements 38-44 shown in FIG. 2 are generally indicated as including the components within corresponding dashed line boxes in FIG. 3. In the reference oscillator 38, a system of two inverters 46 and 48 are arranged in series with a feedback loop including a capacitor 50 and a resistor 52. A branch from the feedback includes a variable resistor 54 and another dropping resistor 56. A bank of capacitors 58, 60, 62, and 64 is provided for selective placement in parallel with feedback capacitor 50 by means of a switch S1.

The switch S1 is a binary coded decimal (BCD) switch with positions 0 through 9 whereby various combinations of the capacitors 58-64 may be selected and placed in parallel with capacitor 50. In position 0, the switch S1 is effectively open so that none of the additional capacitors 58-64 is in parallel with capacitor 50. The capacitance values of the capacitors 58-64 are chosen so that, as switch S1 is set in successive positions 1 through 9, the capacitance in parallel with capacitor 50 increases, with a maximum capacitance available when switch S1 is in position 9. As the capacitance of the feedback loop may be thus varied, the sensitivity of the reference oscillator 38 is varied from a maximum with switch S1 in position 0 to a minimum with S1 in position 9.

The reference oscillator 38 produces a relatively stable, constant-frequency output signal whose frequency value may be selectively adjusted by varying the resistor 54, and whose sensitivity may be selectively adjusted by positioning switch S1.

A similar oscillator circuit is provided for the antenna oscillator 40. A pair of inverters 66 and 68 are arranged in series with a feedback loop that includes a capacitor 70 and resistor 72, and a resistor 74 along the branch leading to the point between the inverters. Since the frequency of the signal generated by the antenna oscilator 40 is not intended to be varied except by the effect of material in the bin 12, no variable resistor is included along the branch with the resistor 74. However, a bank of capacitors 76, 78, 80, and 82 are arranged to be selectively placed in parallel with the capacitor 70 by means of a BCD switch S2. Adjusting the switch S2 to selectively vary the capacitance of the feedback loop by varying the number and value of the capacitors in parallel with capacitor 70 has the same effect as similarly varying the position of the switch S1 in the reference oscillator 38. The capacitance in parallel with capacitor 70 increases as the position of switch S2 varies from 0 to 9. Thus, the sensitivity of the antenna oscillator 40 is a maximum with the switch S2 in position 0, and a minimum with switch S2 in position 9.

The antenna probe 16 is connected to the feedback loop of the oscillator 40 between the resistor 72 and 74. The oscillating signal carried by the feedback loop is loaded on the antenna probe 16. The impedance of the antenna 16 and, therefore, the antenna oscillator circuit 40 may be varied by exposing the antenna to varying amounts of material. Thus, as more of the antenna 16 is surrounded by impedance-affecting material, the impedance of the antenna decreases, and the frequency of the output signal from the antenna oscillator 40 decreases accordingly. The extent of the variation of the frequency of the antenna oscillator output signal from the oscillator base frequency, that is the frequency generated with no material surrounding the antenna 16, is a measure of the extent to which the antenna is thus exposed to the material.

The two oscillators 38 and 40 may be constructed to generate output signals of frequency ranging from, say 100 KHz to 1 MHz, and are typically operated in the 250-750 KHz range. Such a base frequency is sufficiently high that the impedance variation of the antenna probe in practice is primarily capacitive, although resistance is also affected The output signals from the reference oscillator 38 and the antenna oscillator 40 are transmitted to the differencer circuit 42 through inverter amplifiers 84 and 86, respectively. The inverters 84 and 86 act as buffers, and have the effect of converting the respective oscillator output signals into square waves.

The square waves from the inverters 84 and 86 are fed to an integrated circuit frequency differencer 88 at terminals 88a and 88b, respectively. The frequency differencer 88 is a D type latch which produces a signal at output terminal Q whose frequency is equal to the difference between the frequencies of the two input signals. The inverse of the difference frequency output signal provided at Q is produced at output terminal $\overline{Q}$. The difference frequency signal from Q is fed through a copuling resistor 90 to a differential line driver including a transistor 92 and a loading resistor 94. The line driver increases the current in the difference frequency signal from Q to provide a stronger signal to operate the receiver 34a to which the difference frequency signal is then transmitted. Similarly, the inverse difference frequency signal from $\overline{Q}$ is passed through a coupling resistor 96 to a second differential line driver including a transistor 98 and a loading resistor 100. Thus, the difference frequency signal and the inverse difference frequency signal are each boosted in current strength and provided, for transmission to the receiver, at output terminals 102 and 104, respectively.

A conventional d-c power source may be used to provide the necessary power requirements of the various components of the detector circuit. Thus, the differencer circuit 42, the differential line drivers and the frequency differencer are indicated as connected between a +V source and ground. Similarly, the inverter amplifiers 84 and 86 are joined to the power source and ground. A capacitor 106 is provided between the +V level and ground to increase the stability of the power signal as provided for the differencer circuit 42.

The amplified inverse difference frequency signal from the differencer circuit 42 at $\overline{Q}$ is also transmitted to the counter circuit 44 where the signal is fed to input terminal C of an integerated circuit 14 bit binary counter 108. The counter 108 functions by counting the trailing edges of the signal variations received at the input terminal C, which is also connected to the power source +V through a dropping resistor 109. The time during which the counter 108 thus counts the input signal variations is limited by the reception of a reset signal at terminal R of the counter. It will be appreciated that the difference frequency signal from the Q terminal of the differencer could also be fed to the counter, in which case the leading edges of the signal variations would be counted.

As the counter 108 thus functions, it produces successive signals at terminals Q1, Q4, Q7, Q10, and Q14 unless and until the counter is interrupted by a reset signal received at terminal R. The frequencies of the successive signals at the counter output terminals have values that are $2^{-n}$ multiples of the frequency of the signal received at terminal C, where n has the values 1, 4, 7, 10, 12, and 14 for the terminals Q1 through Q14, respectively. Thus, for a given frequency of the signal received at terminal C, the signal generated at terminal Q1 has a frequency one half that of the input signal at C, and the signals that may be generated at terminals Q4 through Q14 have progressively lower frequencies. Furthermore, the counter 108 initiates the output signals in succession in the order of decreasing frequency, with the time delay between the initiation of successive output signals dependent on the frequency of the input signal being counted. Consequently, the higher the frequency of the input signal received at terminal C the faster the counter 108 will initiate the output signals at the successive output terminals. Likewise, for a given period of time, the higher the frequency of the input signal C the greater is the number of output signals that may be initiated by the counter 108.

In the counter circuit 44, an integerated circuit timer 110 provides a reset signal to terminal R of the counter 108. The reset signal is periodically generated by the timer 110, with the period determined by the respective values of resistor 112, across terminals 110a and 110b of the timer, and capacitor 114. In a typical case, the period for generation of the reset signal may be 0.1 second. Then, the time base of the counter 108, that is, the period of time during which the counter may count the voltage variations of the input signal at C and generate output signals in response thereto, is just 0.1 second. The duration of the reset signal itself is determined by the values of a resistor 116 as shown and capacitor 114. A typical reset pulse duration may be about 100 microseconds. Thus, for example, the counter 108 counts the voltage variations of the input signal at terminal C and produces output signals as described hereinbefore in response to the frequency of the input signal for a time equal to the time base, say 0.1 second. Then, during the duration of the reset pulse received at the terminal R, say 100 microseconds, the output signals from the counter 108 cease. After the termination of the reset pulse, the time base begins again, and the counter 108 commences responding to the frequency of the input signal at terminal C to generate the corresponding counter output signals again.

In the operation of the timing circuit 110, the capacitor 114 is charged from the power source +V, discussed hereinbefore, through resistor 116 and a diode 118 in parallel with resistor 112 across the terminals 110a and 110b of the timer circuit. The capicator 114 is discharged through resistor 112 and the timer 110 to determine the frequency of the reset pulse and, therefore, the time base of the counter 108. The timing circuit 110 itself is also powered from the same +V power source, and is additionally provided with a capacitor 120 to ground for filtering and stability of the timer operation.

The first output signal from terminal Q1 of the counter 108 is amplified by an inverter amplifier 122, and the amplified signal fed to a light emitting diode (LED) 124 connected to the power source +V through a resistor 126. A similar combination of inverter amplifier, LED and dropping resistor is provided to receive the output signal from each of the remaining counter output terminals Q4 through Q14. The inverter amplifiers, such as 122, amplify the varying current received as the corresponding counter output signal. The resulting amplified signal placed across the corresponding LED, such as 124, causes the LED to emmit a pulsating light in response to the alternating current of the signal. The frequency of pulsations of the emitted light is the same as the frequency of the output signal generated at the corresponding counter output terminal. When no output signal is generated at a particular counter output terminal, no current flows through the corresponding LED, and no light is emitted thereby.

With the time base of the counter 108 predetermined, the counting circuit 44 thus functions to indicate the approximate value of the frequency of the difference signals generated by the frequency differencer circuit 88, which, in turn, is a measure of the difference between the frequency of the signal produced by the antenna oscillator 40 compared to the frequency of the signal produced by the reference oscillator 38. The greater the difference in frequencies of the two oscillators 38 and 40, the higher is the value of the frequency of the signal received at terminal C of the counter circuit 108, and, for a given time base, the greater is the number of LEDs operated to produce pulsating light. Consequently, the degree of difference between the frequencies of the two oscillator signals may be determined by merely observing the numbers of LEDs functioning to produce light. It will be appreciated from the discussion hereinbefore of the function of the counter 108 that the LEDs are caused to generate light, as the input frequency at terminal C and the time base permit, in order from left to right as viewed in FIG. 3. Thus, the higher frequency output signals that may be produced by the counter 108 will be generated before any correspondingly lower frequency output signals of the counter 108.

The amplified output signals from the differencer circuit 42 which are provided at output terminals 102 and 104 for transmission to the receiver/control unit 34 are square waves, with one square wave signal being the inverse of the other as discussed hereinbefore. Each of the signals at the terminals 102 and 104 varies between 0 and the value +V volts, one of the signals being at +V while the other is at 0 volts. In the receiver 34a, these square wave signals are converted into a voltage level signal, whose value is proportional to the frequency of the corresponding square waves. Voltage level values may thus be generated by the receiver 34a in a range anywhere from, for example, 0 to some predetermined voltage value dependent on the receiver circuitry.

The particular range of voltage values which may be generated by the receiver 34a may be predetermined to correspond to the possible range of output signal frequency values which may be produced by the differencer circuit 42 is response to the antenna probe 16 being exposed to impedance-affecting material to an extent ranging from no such exposure to complete exposure of the entire antenna probe. Consequently, the voltage level generated by the receiver 34a in response to reception of a square wave difference signal will be the same fraction of the full range of voltage values that may be so generated as the fraction of the antenna probe 16 which is actually surrounded by impedance-affecting material. The voltage levels thus provided by the receiver 34a and fed to the control unit 34b may therefore be used to operate analog display devices which indicate the degree of such antenna exposure to impedance-affecting material, that is, the extent to which material M is built up around the antenna probe 16 in the bin 12. Similarly, by appropriate circuitry well known in the art, the receiver 34a may provide appropriate signals corresponding to the level of material in the bin 12 to operate digital display devices reflecting this information.

The control unit 34b may also be utilized to control the addition or removal of material to or from the bin 12. Thus, for example, the control unit 34b may operate the motor 30 in FIG. 1 to add material to the bin by operation of the conveyor belt 28 in response to the voltage level received by the control unit indicating that the material level in the bin has fallen to a particular predetermined position. Similarly, when the material level in the bin has been raised to a predetermined position, the corresponding increase in voltage level generated by the receiver and transmitted to the control unit may cause the control unit to cut the power to the motor 30 to cease the operation of the conveyor belt 28 and the attendant addition of material to the bin. The control unit may also be utilized to operate the door 22 to allow the removal of material from the bin when the level of material reaches a certain point, and to close the door to prevent further removal of material from the bin when the material level has fallen to a predetermined value. Such operation of the bin door 22 may be accomplished, for example, by use of a hydraulic system 128 which operates a fluid pressure cylinder system 130 linked to the door.

The level detector of the present invention provides reference and antenna oscillator circuits with switch-adjusted sensitivity controls, and includes an on-board test circuit for both adjusting the sensitivity of the detector and zeroing the reference oscillator relative to the antenna oscillator.

The detector is sensitivity-adjusted in view of the nature of the material anticipated for storage in the bin, or other container, to which the detector is to be applied. The extent to which a given material affects the impedance of the antenna probe 16 may be described in terms of the "weight" of the material. Thus, material which has a relatively large affect on the antenna impedance is said to have greater weight than material which has a lesser impedance affect. Generally, materials of greater density may be expected to have greater affect on the antenna impedance.

To properly adjust the sensitivity of the antenna oscillator 40, the switch S2 is set on a position from 0 to 9 to reflect the "weight" of the product to be stored in the bin. The greater the weight of the anticipated storage material, the less sensitive the oscillator 40 need be, and, consequently, the higher the position number selected for the switch S2. For example, if plastic granules are to be stored in the bin, the switch S2 may be positioned at 0 for maximum sensitivity; for storing metal shavings or cement, for example, S2 may be sent in position 9 for minimum sensitivity.

With the sensitivity of the antenna oscillator 40 adjusted as described to reflect the "weight" of the material anticipated to be stored in the bin, and the detector circuit in position with the antenna probe extending into the sensing area within the bin devoid of material, several of the LEDs of the counter circuit 44 will most likely be lit. With the bin still empty, the sensitivity of the reference oscillator 38 may be adjusted to match that of the antenna oscillator by setting the position of switch S1 so that as few of the LEDs as possible remain lit. By so adjusting the feedback loop capacitance of the reference oscillator, the susceptibility of the reference oscillator to frequency fluctuations in its output signal is varied to match that of the antenna oscillator 40 under the conditions of the antenna probe being positioned in its operating configuration within the sensing area, that is the bin, and with no material present that is to be detected by the antenna probe. The stability of the two oscillators to external influences on the frequencies of their respective output signals is thus matched, with the minimization of the number of lit LEDs in the counter circuit 44 being an indication of the sensitivity balance.

With the sensitivities of both oscillators thus adjusted in keeping with the "weight" of the material stored in the bin, the detector circuitry may be zeroed by adjusting variable resistor 54 of the reference oscillator 38 to extinguish all of the LEDs of the counting circuitry 44. When this condition is achieved, the difference signal present at terminal C of the counter 108 has a frequency of 0, indicating that the two oscillator circuits 38 and 40 are generating output signals of identical frequency. The detector circuit is then ready for use to measure the extent of filling of the bin.

The detector of the present invention may be positioned with the antenna probe extending into a bin, or other sensing area. As material builds up in the area, the antenna probe is partly immersed in the material causing a reduction in the antenna impedance load and a decrease in the frequency of the antenna oscillator signal. The frequency of the differencer circuit output signals increases accordingly, causing the voltage level produced in the receiver to increase. Whatever percentage of the antenna probe is immersed in the impedance-affecting material, the receiver-produced voltage will be an equal percentage of the value of a predetermined maximum voltage level. The receiver voltage level reaches this maximum value when the entire antenna probe is completely immersed in the impedance-affecting material.

The control unit may utilize the varying voltage level, produced by the receiver in response to immersion of the antenna probe in material in the bin, to operate various ancillary devices that may function to both indicate the extent of material present in the bin and/or to control the quantity of material present in the bin. In this way, not only may information concerning the quantity of material present in the bin be readily available to an operator, but the addition to, or removal from, the bin of material M may be automatically controlled through the sensing by the level detector in the operation of the control unit.

The antenna probe 16 may be of a variety of designs. A metal rod, or a metal cable appropriately extended as illustrated, may be used as an antenna probe. The nature of the application may also render one or another intended design more desirable. For example, where abrasive or corrosive materials are to be stored in the bin, the antenna probe may be coated or otherwise protected. Further, the extent to which the antenna probe is immersed in the impedance-affecting material will be detected by the level detector of the present invention. Consequently, if information concerning any quantity of material in the bin, including relatively small amounts of material that may be present, is required, the antenna probe should be constructed and positioned to extend virtually the entire height of the bin. Otherwise, only that portion of the bin through which the antenna probe is extended will be monitored to determine the presence and amount of material therein.

It will be appreciated that the level detector of the present invention may be used to detect the presence and quantity of a variety of materials, since virtually any material will have an effect on the impedance load of the antenna probe. Furthermore, the variation and degree of effect of different materials on the impedance load of the antenna probe may be compensated for with the present invention by appropriately adjusting the sensitivities of the two oscillators as described hereinbefore.

The foregoing disclosure and description of the invention is illustrative and explanatory thereof, and various changes in the method steps as well as the details of the illustrated apparatus may be made within the scope of the appended claims without departing from the spirit of the invention.

I claim:

1. Apparatus for measuring a variable quality or quantity of matter present within a sensing area comprising:
   (a) signal generation means including first oscillator means for providing an oscillatory signal, and including sensitivity control means for selectively adjusting the sensitivity of said signal generation means;
   (b) antenna probe means, as part of said signal generation means, for extending in said sensing area and for receiving said oscillatory signal whereby the frequency of said oscillatory signal is varied in accordance with the modification of impedance of said antenna probe means due to the exposure of said antenna probe means to matter within said sensing area;
   (c) electrical processing means for receiving said oscillatory signal and for producing an output signal whose frequency varies as the extent of the antenna probe means so exposed to material within said sensing area; and
   (d) test circuit means, as part of said electrical processing means, for receiving said output signal and providing a test output indicative of the value of said output signal frequency, including
      (i) counter means for receiving said output signal and for providing, as said test output, counter signals, initiated in sequence, of frequencies that are, progressively, smaller fractional multiples of the frequency of the output signal, wherein a zero output signal frequency results in no oscillatory counter signals being provided;
      (ii) indicator means for separately signaling the production of each such counter signal; and
      (iii) timing means for periodically providing a reset signal to said counter means to define a time span during which said counter means may so produce said counter signals in sequence, said counter means thereafter initiating a subsequent time span for producing counter signals.

2. Apparatus as defined in claim 1 wherein:
   (a) said signal generation means further includes reference oscillator means for providing a reference oscillatory signal; and
   (b) said electrical processing means further includes differencer means for comparing said oscillatory signal from said first oscillator means with said reference oscillatory signal whereby said output signal is produced with a frequency determined by the difference in the frequencies of said two compared oscillatory signals.

3. Apparatus as defined in claim 2 wherein said sensitivity control means includes:
   (a) first variable capacitance means within said first oscillator means, selectively adjustable by first switch means to selectively adjust the sensitivity of said first oscillator means; and
   (b) second variable capacitance means within said reference oscillator means, selectively adjustable by second switch means to selectively adjust the sensitivity of said reference oscillator means.

4. Apparatus as defined in claim 3, and in the alternative as defined in claim 2 further comprising zeroing means as part of said signal generation means whereby said reference oscillator means may be adjusted to so provide said reference oscillatory signal at a frequency equal to that of the frequency of said oscillatory signal from said first oscillator means.

5. Apparatus as defined in claim 4 further comprising means for receiving said output signal and for controlling ancillary apparatus in response to said output signal.

6. Apparatus as defined in claim 5 wherein said ancillary apparatus includes means for adding matter to said sensing area.

7. Apparatus as defined in claim 5 wherein said ancillary apparatus includes means for removing matter from said sensing area.

8. Apparatus as defined in claim 1 further comprising means for receiving said output signal and for controlling ancillary apparatus in response to said output signal.

9. Apparatus as defined in claim 8 wherein said ancillary apparatus includes means for adding matter to said sensing area.

10. Apparatus as defined in claim 8 wherein said ancillary apparatus includes means for removing matter from said sensing area.

11. Apparatus as defined in claim 1 wherein said sensitivity control means includes switch means whereby the sensitivity of said signal generation means may be selectively adjusted by so varying a parameter therein.

12. Apparatus as defined in claim 11 wherein said parameter of said signal generation means is capacitance in at least one circuit of said signal generation means.

13. A system for monitoring the level of material in a container comprising:
   (a) signal generation means including:
      (i) reference oscillator means for providing a reference oscillatory signal, and including first sensitivity control means for selectively adjusting the sensitivity of said reference oscillator means, and frequency adjustment means for selectively adjusting the frequency of said reference oscillatory signal;
      (ii) antenna oscillator means for providing a second oscillatory signal, and including second sensitivity control means for selectively adjusting the sensitivity of said antenna oscillator means; and
      (iii) antenna probe means for positioning within said container and for receiving said second oscillatory signal whereby the frequency of said second oscillatory signal is varied in accordance with the modification of impedance of said antenna probe means due to the exposure of said antenna probe means to material within said container; and
   (b) processing means, including differencer means for receiving both said reference oscillatory signal and said second oscillatory signal and for producing at least one output signal of frequency equal to the difference between the frequencies of said two oscillatory signals; and (c) test means, as part of said processing means, for receiving such output signal and providing test output indicative of the value of said differencer means output signal frequency, including
   (i) counter means for receiving said output signal and for providing, as said test output, counter signals, initiated in sequence, of frequencies that are, progressively, smaller fractional multiples of the frequency of the output signal, wherein a zero output signal frequency results in no oscillatory counter signals being provided;
   (ii) indicator means for separately signaling the production of each such counter signal; and
   (iii) timing means for periodically providing a reset signal to said counter means to define a time span during which said counter means may so produce said counter signals in sequence, said counter means thereafter initiating a subsequent time span for producing counter signals.

14. A system as defined in claim 13 wherein said indicator means comprises a plurality of light emitting diodes arranged so that each such diode may be operated by a single, different counter signal.

15. A system as defined in claim 13 wherein:
(a) said first sensitivity control means includes first switch means whereby capacitance in said reference oscillator means may be selectively varied to so adjust the sensitivity of said reference oscillator means; and
(b) said second sensitivity control means includes second switch means whereby capacitance in said antenna oscillator means may be selectively varied to so adjust the sensitivity of said antenna oscillator means.

16. A system as defined in claim 15 wherein said frequency adjustment means includes variable resistance means in said reference oscillator means.

17. A system as defined in claim 16 wherein said indication means comprises a plurality of light emitting diodes arranged so that each such diode may be operated by a single, different counter signal.

18. A system as defined in claim 16 further comprising means for receiving said output signal and for controlling ancillary apparatus in response to said output signal.

19. A system as defined in claim 18 wherein said ancillary apparatus includes means for adding material to said container.

20. A system as defined in claim 18 wherein said ancillary apparatus includes means for removing material from said container.

21. A system as defined in claim 13 wherein said frequency adjustment means includes variable resistance means in said reference oscillator means.

22. A system as defined in claim 13 further comprising means for receiving said output signal and for controlling ancillary apparatus in response to said output signal.

23. A system as defined in claim 22 wherein said ancillary apparatus includes means for adding material to said container.

24. A system as defined in claim 22 wherein said ancillary apparatus includes means for removing material from said container.

25. A system as defined in claim 15 wherein said first and second switch means each comprises a binary coded decimal switch, and said corresponding capacitance is provided, at least in part, by a plurality of capacitors connectable by said switch.

26. A frequency-modulated continuous level detector including switch-adjusted sensitivity control means and test circuit means for use in both adjusting the sensitivity of, and zeroing, said detector, wherein said test circuit means includes:
(a) counter means for receiving an output signal of the detector and for providing, as test output, counter signals, initiated in sequence, of frequencies that are, progressively, smaller fractional multiples of the frequency of the detector output signal, wherein a zero output signal frequency results in no oscillatory counter signals being provided;
(b) indicator means for separately signaling the production of each such counter signal; and
(c) timing means for periodically providing a reset signal to said counter means to define a time span during which said counter means may so produce said counter signals in sequence, said counter means thereafter initiating a subsequent time span for producing counter signals.

27. Apparatus as defined in claim 5 wherein said ancillary apparatus includes means for indicating the quality or quantity of matter present within said sensing area.

28. Apparatus as defined in claim 8 wherein said ancillary apparatus includes means for indicating the quality or quantity of matter present within said sensing area.

29. A system as defined in claim 18 wherein said ancillary apparatus includes means for indicating the level of material in said container.

30. A system as defined in claim 22 wherein said ancillary apparatus includes means for indicating the level of material in said container.

31. A method of monitoring the quantity of material at a location comprising the following steps:
(a) providing a first oscillator and an antenna probe for positioning at the location and such that the frequency of the output signal produced by the first oscillator varies from a predetermined base frequency as the impedance of the antenna probe is altered by exposure of the antenna probe to material;
(b) providing a reference oscillator with adjustable frequency control whereby the frequency of the output signal generated by the reference oscillator may be selectively adjusted;
(c) providing an adjustable sensitivity control in the circuit of each of the two oscillators;
(d) providing a signal processor including a differencer circuit for comparing the output signals of both oscillators and for producing an output signal whose frequency is equal to the difference in frequencies of the output signals of the two oscillators;
(e) providing a test circuit as part of the signal processor including a counter for receiving the differencer circuit output signal and producing, initiated in sequence, counter output signals dependent on the frequency of the differencer circuit output signal, the production of such counter output signals being limited by the periodic occurrence of a reset signal from a timer such that the number of such counter output signals that may be produced during the time between successive reset signals increases as the frequency of the differencer output signal increases, no such counter output signals being produced for a differencer output signal of zero frequency;

(f) with the antenna probe free from exposure to such material, adjusting the sensitivity control of the first oscillator in accordance with the extent of effect material to be monitored is anticipated to have on the antenna probe impedance;

(g) adjusting the sensitivity control of the reference oscillator to match the sensitivity of the reference oscillator to that of the first oscillator whose sensitivity control has been so adjusted by determining the number of counter output signals being produced at a time as the sensitivity control of the reference oscillator is being adjusted; and (h) adjusting the frequency control of the reference oscillator, whose sensitivity has been so adjusted, to match the frequency of the signal generated by the reference oscillator to the base frequency of the first oscillator whose sensitivity has been so adjusted by determining the number of counter output signals being produced at a time as the frequency control of the reference oscillator is being adjusted.

32. A method as defined in claim 31 wherein the sensitivity control in the circuit of each of the two oscillators includes a plurality of capacitors and a separate switch such that the capacitance along a feedback loop in the respective oscillator may be selectively varied to carry out the corresponding step of adjusting the respective oscillator sensitivity by so adjusting the configuration of the switch whereby the particular one or more of the plurality of capacitors is electrically connected in the feedback loop.

33. A method as defined in claim 32 wherein the test circuit further includes visual display devices operable by the counter output signals to indicate the number of such counter output signals being produced at a time.

34. A method as defined in claim 33 wherein the counter of the test circuit is a binary counter, and the visual display devices are light emitting diodes.

35. A method as defined in claim 32 further comprising the additional steps of:

(a) providing means for receiving the differencer output signal and for controlling ancillary apparatus in response thereto; and (b) so controlling ancillary apparatus.

36. A method as defined in claim 35 comprising the additional step of employing said ancillary apparatus for adding material generally at said location.

37. A method as defined in claim 35 comprising the additional step of employing said ancillary apparatus for removing material generally from said location.

38. A method as defined in claim 35 further comprising the additional step employing said ancillary apparatus for indicating the quantity of material at the location.

39. A method as defined in claim 31 and, in the alternative as defined in claim 32 further comprising the additional steps of:

(a) providing means for receiving the differencer output signal and for controlling ancillary apparatus in response thereto; and (b) so controlling ancillary apparatus.

40. A method as defined in claim 39 comprising the additional step of employing said ancillary apparatus for adding material generally at said location.

41. A method as defined in claim 39 comprising the additional step of employing said ancillary apparatus for removing material generally from said location.

42. A method as defined in claim 39 further comprising the additional step of employing said ancillary apparatus for indicating the quantity of material at the location.

* * * * *